US008475540B2

(12) United States Patent
Sanjurjo et al.

(10) Patent No.: US 8,475,540 B2
(45) Date of Patent: Jul. 2, 2013

(54) MULTI-STAGE SYSTEM FOR REACTION AND MELT COALESCENCE AND SEPARATION

(75) Inventors: Angel Sanjurjo, San Jose, CA (US); Kai-Hung Lau, Cupertino, CA (US); Xiaobing Xie, Foster City, CA (US); Lorenza Moro, San Carlos, CA (US); Jordi Perez Mariano, Menlo Park, CA (US); Gopala N. Krishnan, Sunnyvale, CA (US); Marc Hornbostel, Palo Alto, CA (US); Anoop Nagar, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 934 days.

(21) Appl. No.: 12/539,708

(22) Filed: Aug. 12, 2009

(65) Prior Publication Data

US 2011/0038779 A1 Feb. 17, 2011

(51) Int. Cl.
*B01J 6/00* (2006.01)
(52) U.S. Cl.
USPC ..................... 23/308 R; 23/295 R
(58) Field of Classification Search
USPC ........................... 23/308 R, 295 R
See application file for complete search history.

(56) References Cited

U.S. PATENT DOCUMENTS

| 3,148,131 | A | | 9/1964 | Coursier et al. |
| 4,828,814 | A | * | 5/1989 | Sanjurjo et al. .............. 75/433 |
| 6,231,826 | B1 | * | 5/2001 | Hanazawa et al. ............ 423/348 |

FOREIGN PATENT DOCUMENTS

| CN | 101142330 A | 3/2008 |
| CN | 101432453 A | 5/2009 |
| JP | P2002 322515 A | 11/2002 |
| WO | WO 2007/127482 A2 | 11/2007 |
| WO | WO 2009/150961 A2 | 12/2009 |

OTHER PUBLICATIONS

Supplementary Search Report for PCT/US2010/045144, Nov. 23, 2010, copy consists of 15 unnumbered pages.
Nanis L et al. "Fluxing Action of NaF on Oxidized Silicon" Metallurgical and Materials Transactions B—Process Metallurgy and Materials Processing Science, Springer New York LLC, United States vol. 12 B, No. 3 Sep. 1, 1981 pp. 535-537 XP009139585 ISSN: 0360-2141.
First Office Action for CN 201080040376.5, Feb. 17, 2013, copy consists of 15 unnumbered pages.

* cited by examiner

*Primary Examiner* — Edward Johnson (57) ABSTRACT

In one embodiment, the present invention relates generally to a multi-stage system for performing melt coalescence and separation, the multi-stage system. In one embodiment, the multi-stage system includes a first container for mixing a powder with a salt, the first container having an opening, a heating means coupled to the first container for heating the first container and a second container coupled to the first container.

19 Claims, 5 Drawing Sheets

MULTI-STAGE SYSTEM FOR REACTION AND MELT COALESCENCE AND SEPARATION

FIELD OF THE INVENTION

The present invention relates generally to purification and melt coalescence-separation of fines or powders of various materials and more specifically to a multi-stage system for reaction, purification and melt coalescence-separation of fine powders.

BACKGROUND OF THE INVENTION

There continues to be an increasing demand for the production of high purity materials including metals, semiconductors and ceramics. One potential way of saving costs is to recycle leftover materials from various industrial processes, such as sawing, grinding, or from by-products of fluid bed and filament reactors, or from production processes that result in very fine powder distribution in a second meltable phase to produce these high purity materials.

However, leftover materials are difficult to handle because of their size that result in a very high surface area which can be easily contaminated, reacted or degraded and very low thermal conductivity even for their compacts, which makes it difficult to heat and melt. For example, some leftover materials are not being adequately reused because of the difficulty of melting them in a clean system and re-generating a high purity material.

SUMMARY OF THE INVENTION

In one embodiment, the present invention relates generally to a multi-stage system for performing melt coalescence and separation. In one embodiment, the multi-stage system comprises a first container for mixing a powder with a salt, said first container having an opening, a heating means coupled to said first container for heating said first container and a second container coupled to said first container.

In one embodiment, the present invention is directed towards a method for performing melt coalescence and separation of a powder. The method comprises mixing said powder with a second material, providing a mixture of said powder and said second material in a first container, heating said first container to a first temperature to melt said second material, draining said second material out of said first container into a second container, heating said first container to a second temperature to melt said powder and draining said powder out of said first container into said second container.

In one embodiment, the present invention is directed towards a multi-stage system for performing melt coalescence and separation. The multi-stage system comprises a first container for mixing a powder with a salt, said first container having an opening, a heating means coupled to said first container for heating said first container and a plurality of second containers continuously fed to and removably coupled to said first container.

BRIEF DESCRIPTION OF THE DRAWINGS

So that the manner in which the above recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The present invention generally relates to a multi-stage system for reaction and melt coalescence followed by separation of fine powders. Currently, fine powders are not adequately reused. For example, these fine powders may be generated from various industrial processes or manufacturing steps that involve various elements or compounds such as, for example, silicon, titanium, cadmium telluride (CdTe), gallium arsenide (GaAs) and the like. For example, silicon fines or powder may be obtained from silicon production reactors such as filament or fluid bed reactors due to homogeneous nucleation. The present invention may also be applicable to powders, fines or broken pieces (hereinafter interchangeably referred to as simply "powders" or "powder") of materials obtained from other semiconductor and solar cell manufacturing steps including, but not limited to, cutting, grinding, lapping, sawing, or other processes where the powder or broken pieces are typically a by-product.

One reason that these powders, fines or broken pieces are not adequately reused is because of the difficulty in melting them in a clean system, as noted above. In addition, the powders may be lost during generation when they are heated. For example, when using silicon powders, the silicon may be lost during heating and melting in silica crucibles as silicon oxide (SiO) vapors.

In addition, current batch processes are time consuming and require a high amount of labor to remove ingots that may stick to a crucible. Thus, the present novel multi-stage system for reaction and melt separation resolves these issues and provides more efficient system and method.

In one embodiment, the powder may be mixed with a second material that allows the powder to be melt-consolidated into an ingot. A mixture of the powder and the second material may be placed in the multi-stage system for the melt coalescence and separation. The powder and the second material may be pre-mixed before placing the mixture in the multi-stage system or the powder and the second material may be mixed in a container in the multi-stage system. Subsequently, an ingot of solidified powder may be removed from the second material as described below.

The powder may be, for example, silicon (Si), titanium (Ti), GaAs or CdTe. In one embodiment, the powder comprises fine powders, wherein at least 20 percent of the fine powders have a diameter of less than 1 micron. The powder may comprise more than 20 percent nanometer sized fines or powders. In another embodiment, the powder may comprise more than 50 percent nanometer sized fines or powders. In another embodiment, the powder may comprise more than 66 percent nanometer sized fines or powders. The size of the fines or powders refers to the diameter of each particle of fine or powder.

The second material may be a salt. For example, the salt may be an ionic halide. For example, the salt may be a halide and their mixtures of lithium (Li), sodium (Na), potassium (K), magnesium (Mg), strontium (Sr), calcium (Ca) or barium (Ba). For example, the ionic halide may be at least one of sodium fluoride (NaF), lithium fluoride (LiF), potassium fluoride (KF), calcium fluoride ($CaF_2$), strontium fluoride ($SrF_2$), barium fluoride ($BaF_2$) or lanthanum fluoride ($LaF_3$). In another embodiment, depending on what type of powder is used, the second material may contain other halides such as chlorides (e.g., cadmium chloride ($CdCl_2$)) or up to 20 percent of a silicate such as, for example, $Na_2SiO_3$ or may be an oxide such as, for example silica ($SiO_2$) or boric oxide ($B_2O_3$).

Figure 1:
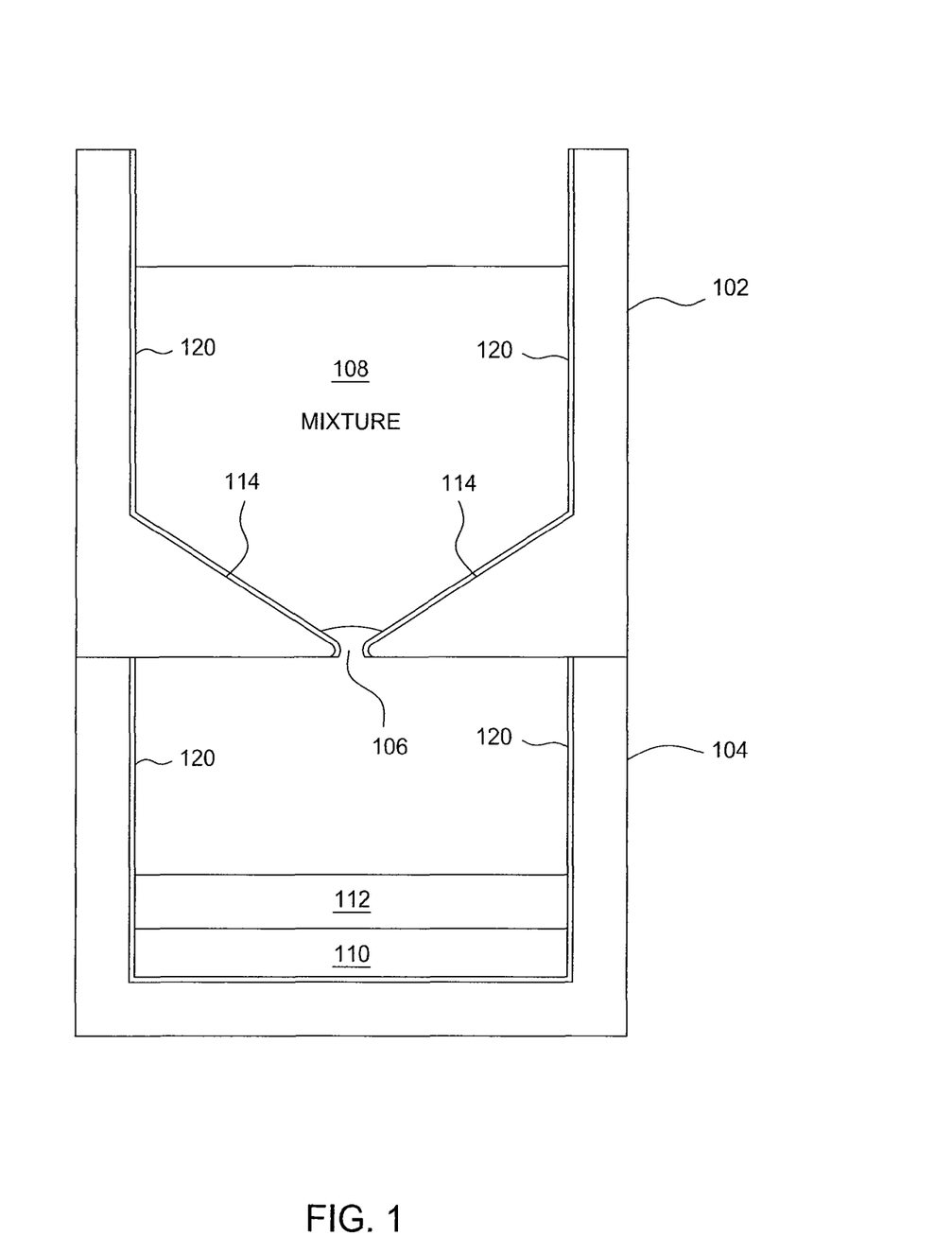
FIG. 1 depicts an embodiment of a two stage system.

One embodiment of the multi-stage system for performing the reaction and melt coalescence of a target powder followed by separation from the accompanying phases includes a two-stage system 100 as illustrated in FIG. 1. The two-stage system 100 includes a first container 102 and a second container 104. The second container 104 may be removably coupled to the first container 102. In one embodiment, the first container 102 may be lined with a lining material 120, e.g., graphite, to prevent a mixture 108 of the powder and the second material, or other forming liquids, from interacting with the first container 102. In another embodiment, the first container 102 may be lined with silicon nitride ($Si_3N_4$) or silicon carbide (SiC).

The mixture 108 of the powder and the second material may be placed into the first container 102. The first container 102 may contain a means for discharging or draining the second material out of the first container 102 and into the second container 104. The second material may be partially drained or alternatively, the second material may be completely drained. In addition, the second material is separately discharged or drained.

The means for draining may be an opening in the first container 102. In one embodiment the opening may be a hole 106 in a bottom of the first container 102. Although FIG. 1 illustrates only one hole 106, those skilled in the art will recognize that the first container 102 may have any number of holes 106. Moreover, hole 106 may refer to a single hole 106 or a plurality of holes 106.

The bottom of the first container 102 may include one or more inclined surfaces 114 to allow molten material (e.g., after the second material is melted) to drain through the hole 106. The incline may be any angle such that the molten material drains through the hole 106. For example, the incline may be 5 degrees, 20 degrees or greater than 30 degrees.

In one embodiment, the hole 106 is approximately 1 millimeter (mm) to 2 centimeters (cm) in diameter. In another embodiment, the hole 106 is approximately 3 mm to 10 mm in diameter.

Although the hole 106 is illustrated in FIG. 1 as being in the bottom of the first container 102, the present invention contemplates that the hole 106 may be located anywhere on the first container 102 such that the second material, and eventually the melted powder, may be drained from the first container 102. For example, the hole 106 may be placed laterally on the first container 102 such that the first container 102 may be tilted to drain the second material and, subsequently, the liquid resulting from melting the powder.

In another embodiment, the opening may be a top opening of the first container 102. The top opening may have a lip for pouring out the melted second material and, subsequently, the liquid resulting from melting the powder.

In yet another embodiment, both approaches of draining through the bottom via the hole 106 and the top opening of the first container 102 may be used. For example, the hole 106 may have a small diameter, such as less than 1 mm, such that only the melted second material may be drained through the hole 106 and the liquid resulting from melting powder may be poured out the top opening of the first container 102.

A heating means 200 may be coupled to the first container 102 for heating the first container 102 and melting the second material and the powder. In one embodiment, the heating may be performed progressively in stages. For example, the first container 102 may be heated to a first temperature. The first temperature may be maintained for a period of time. Then the first container 102 may be heated to a second temperature. Alternatively, the heating may be performed continuously.

Figure 2:
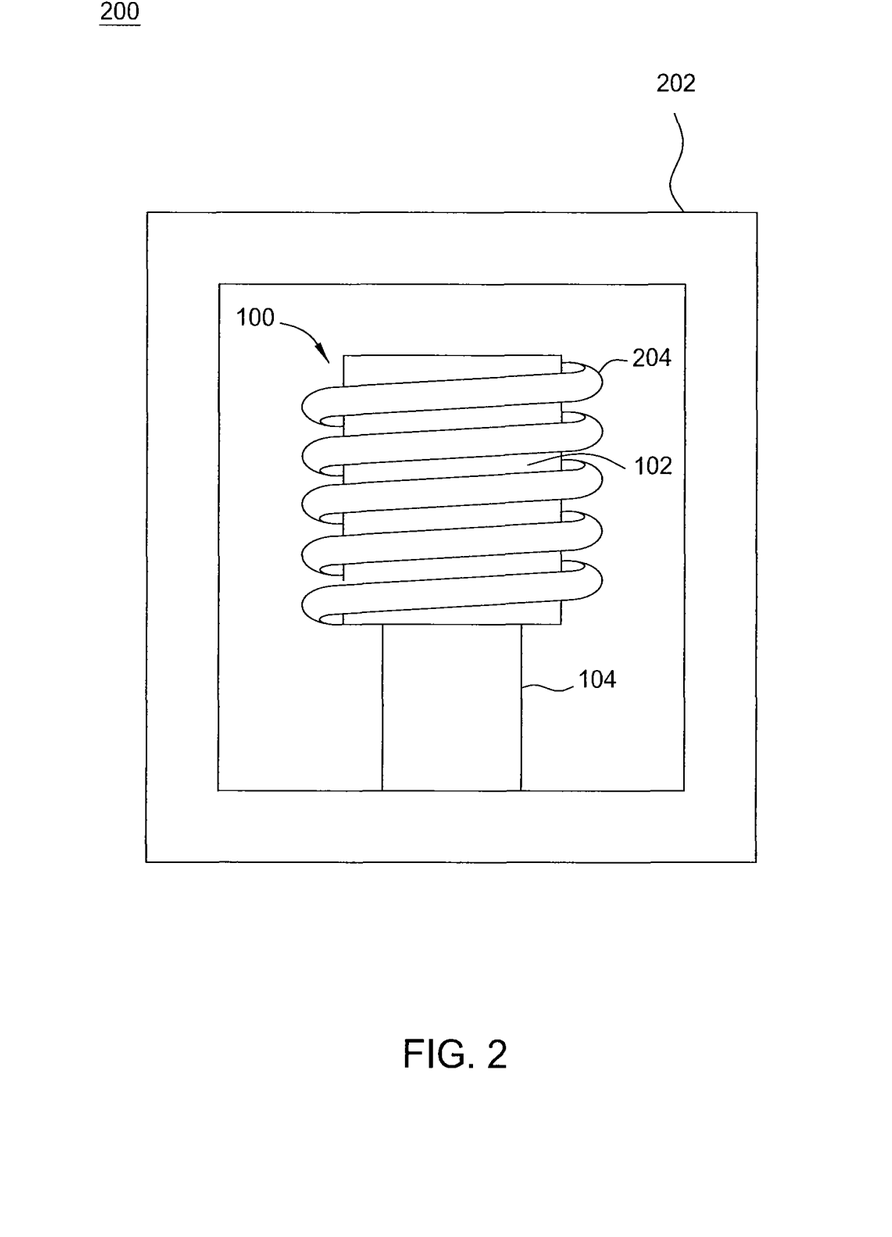
FIG. 2 depicts an embodiment of a two stage system in an RF furnace.

FIG. 2 illustrates one embodiment of the heating means 200. For example, the two-stage system 100 may be placed inside a furnace 202 and be coupled to heating coils 204. For example, the heating coils 204 may be radio frequency (RF) heating coils. Although an RF furnace is illustrated as an example in FIG. 2, any heating means may be used. For example, the heating means may include resistance heating, radiation heating and the like.

In one embodiment, the two-stage system 100 may be placed in the furnace 202 and kept under an inert atmosphere. In another embodiment, a small partial pressure of a gas, such as silicon tetrafluoride ($SiF_4$) for example, may be added and then the system heated. Other vapors or species such as titanium tetrachloride ($TiCl_4$) during Ti consolidation, As or a precursor during GaAs consolidation or, Cd, $CdCl_2$ or Te vapors during CdTe consolidation can also be used.

With the mixture 108 in the first container 102, the first container 102 is heated via the heating means 200 to a first temperature to melt the second material. With reference back to FIG. 1, as the second material melts the second material may drain partially through the hole 106 into the second container 104. Notably, the melted second material may also include other impurities. In other words, by heating the first container 102, the two-stage system 100 may perform melt coalescence, separation and purification simultaneously. The second container 104 may be cooled to solidify the second material on discharge leaving a first layer 110 of the second material. Subsequently, the first container 102 may be heated to a second temperature to melt the powder and drain the liquid resulting from the melted powder into the second container 104. As a result, a pure solid ingot of material from the original powder may be formed as a second layer 112 that may be easily removed from the second container 104.

In one embodiment, the second container 104 may have a controlled cooling mechanism. Slow controlled cooling in the second container 104 helps to achieve further purification of the ingot obtained from the powder. As a result, an interface may be localized and easily removed from the remaining pure solidified ingot resulting from the original powder.

Similar to the first container 102, the second container 104 may also be lined with a lining material 120 such that it is inert with respect to the second material and the powder. For example, the second container 104 may also be lined with graphite, silicon nitride or silicon carbide.

In one embodiment, the powder may be processed through pre-cleaning steps to remove any organics, metals, oxides and/or carbides on the powder. For example, the powder may be processed via pre-cleaning steps such as surfactant or dispersant-aided flotation separation, acetone or similar solvent cleaning to remove organics and partial etching with acid/oxidant mixtures such as those that can be obtained by mixtures of HF, $HNO_3$, HCl, $H_2O_2$ and the like to remove surface oxides and or metallic impurities.

The pre-cleaned powder may then be pelletized or consolidated by any known technique by using, for example, solutions or slurries of the second material and then drying the pellets. One example of the present invention is provided below.

EXAMPLE 1

In one example, pure silicon ingots were formed from silicon fines from a fluid bed reactor homogeneous nucleation or silicon powders from silicon wafer grinding, all with sizes mostly in the nanometer to micrometer range, that were mixed with sodium fluoride (NaF). A mixture 108 of silicon powder and NaF was placed in a first container 102 of a two-stage system 100. The two stage system 100 was placed in a furnace 202 using RF heating coils and kept at an inert atmosphere.

The first container 102 was heated to a first temperature between 990 degrees C. (° C.) to 1400° C. to melt the NaF and aid in the heat transfer and clean up the surface oxide of the Si powders. The NaF with some byproduct $Na_2SiO_3$, and corresponding fluorosilicates and the impurities entrained in them were allowed to partially drain out of the first container 102 via the hole 106 into a second container 104. The molten NaF with its impurity content was solidified in the second container 104.

Subsequently, the first container 102 was heated to a second temperature above 1420° C. to melt the silicon powder. The molten silicon powder still wetted with some NaF was drained from the first container 102 via the hole 106 into the second container 104 on top of the solidified NaF. The molten silicon powder was solidified as a pure silicon ingot on top of the NaF layer.

As discussed above, the present two-stage system 100 and methods described above may also be used on other metallic powders and fines such as titanium (Ti). For example, Ti powder may be mixed with $CaF_2$ in the first container 102 and heated to a first temperature over 1440° C. to melt and discharge most of the $CaF_2$ into the second container 104. Subsequently, the first container 102 may be heated to a second temperature over 1640° C. to melt consolidate the Ti powder. Other second materials may be used to control the melting point, density and other properties of the mixture such as, for example, $SrF_2$, $BaF_2$ and $LaF_2$.

The above techniques may also be used by directly feeding the powder to be consolidated to a melt of the second material where the powder will melt to form submicron to micron droplets that then can be coalesced into a larger pool. For example in one embodiment, Ti fine powder, Ti pellets formed from the powder or Ti—$CaF_2$ pellets can be added directly to molten $CaF_2$ so that wetting and heat transfer to the Ti powder is accelerated. As the powder progresses down the melt it reaches the melting point and a resulting Ti droplets in $CaF_2$ coalesce into larger Ti droplets and eventually in a Ti pool at the bottom.

This technique can be also used to simultaneously produce and consolidate a desired material in one reactor. For example, a precursor of the desired material may be added to a second material directly, for example a NaF melt, to first react and then melt consolidate.

For example, gallium (Ga) and arsenic (As) or their mixtures with NaF (or $B_2O_3$ or any other meltable non-reactive media) can be fed to a melt, allowed to react to form GaAs in situ, then droplets of the GaAs may be allowed to melt consolidate and then the mixture may be processed to discharge the GaAs separately from the NaF (or $B_2O_3$).

Similarly, saw dust resulting from CdTe wafer fabrication or cadmium (Cd) and tellurium (Te) powders (or their mixtures with NaF powders) can be added to molten NaF or heated until they react. The temperature may be kept above the melting point of CdTe so that droplets of the material coalesce into a pool and then separate from the salt so that the two materials can be discharged separately. $CdCl_2$ can be added to control the activity of the components if needed.

Figure 3:
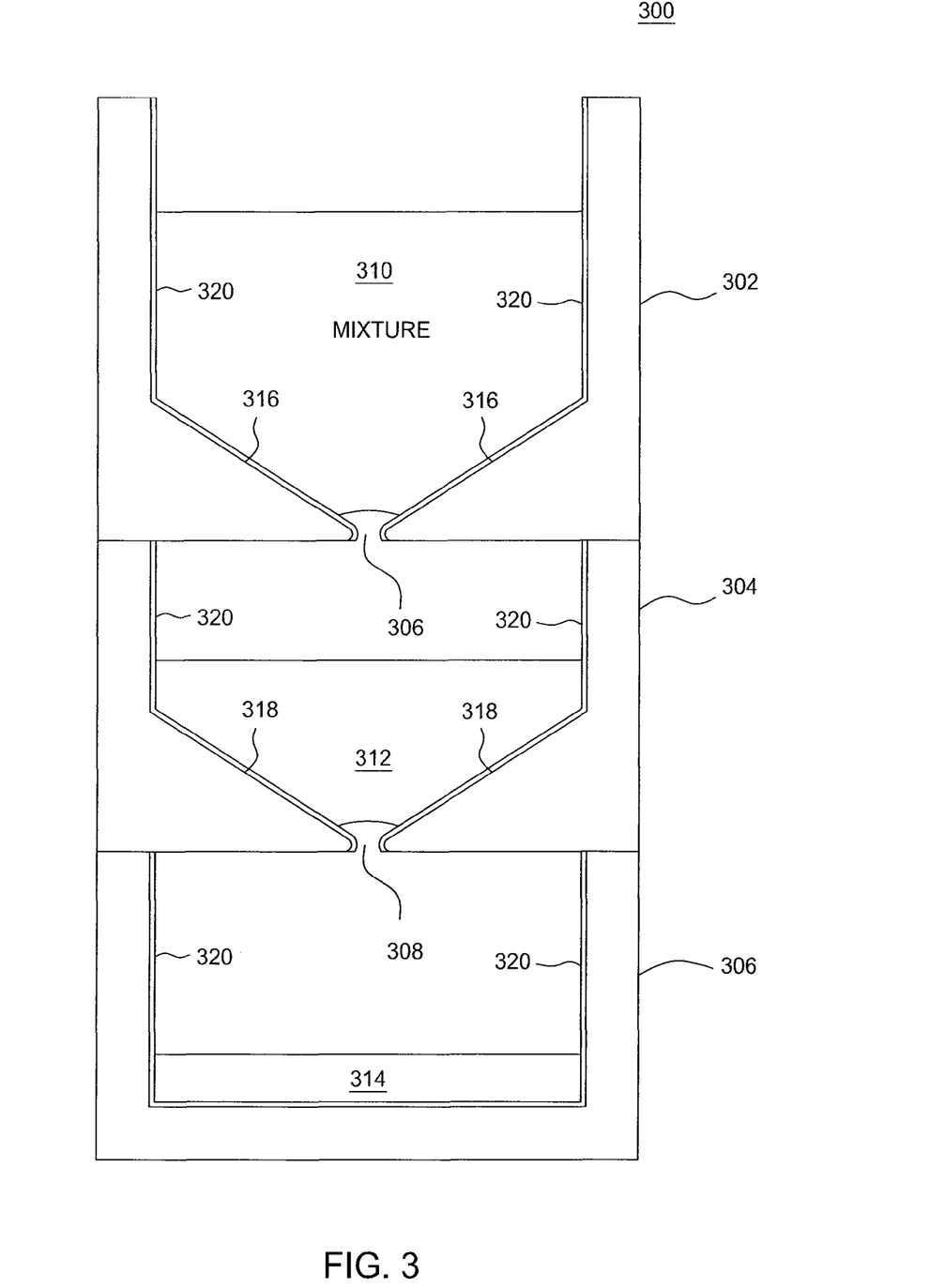
FIG. 3 depicts an embodiment of a three stage system system.

FIG. 3 illustrates an alternate embodiment of a multi-stage system for performing the reaction and melt separation that includes a three-stage system 300. The three-stage system 300 includes a first container 302, a second container 304 and a third container 306.

In one embodiment, the first container 302 may include a means for discharging or draining a mixture 310 of the powder and the second material out of the first container 302 and into the second container 304. In one embodiment, the means for draining may be an opening in the first container 302. For example, the opening may be a hole 306 in the bottom of the first container 302. The bottom of the first container 302 may include one or more inclined surfaces 316 to allow the mixture 310 of the powder and the second material to drain through the hole 306. The incline may be any angle such that the mixture 310 of the powder and the second material drains through the hole 306. For example, the incline may be 5 degrees, 20 degrees or greater than 30 degrees.

Similarly, the second container 304 may also include a means for discharging or draining the second material out of the second container 304 and into the third container 306. In one embodiment, the means for draining may be an opening in the second container 304. For example, the opening may be a hole 308 in the bottom of the second container 304. The bottom of the second container 304 may include one or more inclined surfaces 318 to allow the second material to drain through the hole 308. The incline may be any angle such that the second material drains through the hole 308. For example, the incline may be 5 degrees, 20 degrees or greater than 30 degrees.

Although FIG. 3 illustrates the first container 302 and the second container 304 having a single hole 306 and 308, respectively, those skilled in the art will recognize that the first container 302 and the second container 304 may have any number of holes. Thus, hole 306 and hole 308 may be interpreted as referring to a single hole 306 or hole 308 or a plurality of holes 306 or holes 308.

In one embodiment, the holes 306 and 308 may each be approximately 1 millimeter (mm) to 2 centimeters (cm) in diameter. In another embodiment, the holes 306 and 308 may each be approximately 3 mm to 10 mm in diameter. The holes 306 and 308 may have the same diameter or may be different diameters.

In one embodiment, a mechanical plug or a plug consisting of powder of a halide with a higher melting point can be used to retain most of the second material until the powder of the material to be recovered has melt coalesced before the discharge proceeds.

Similar to the various ways hole 106 may be located on the first container 102 of the two-stage system 100, hole 306 and 308 may be similarly arranged on the first container 302 and the second container 304, respectively. In addition, similar to the first container 102 in FIG. 1, the opening may be a top opening of the first container 302 and the second container 304. For example, the top opening of the first container 302 and the second container 304 may have a lip for pouring out the melted second material and the melted powder.

In one embodiment of the three-stage system 300, a first heating means (not shown) may be coupled to the first container 302 for heating the first container 302. In addition, a second heating means (not shown) may be coupled to the second container 304 for heating the second container 304. The first heating means and second heating means may each use the same type of heating mechanism such as RF heating coils, resistance heating, radiation heating and the like. Alternatively, each container 302 and 304 may each use a different type of heating mechanism. The first heating means and the second heating means may be similar to the RF heating coils illustrated in FIG. 2.

With the mixture 310 in the first container 310, the first container 310 may be heated via the first heating means to a first temperature to melt the mixture 310 of the powder and the second material.

The melted mixture 310 may be drained into the second container 304. The second heating means may heat the second container to a second temperature that is above the melting point of the second material, but below the melting point of the powder. As a result, the second material may melt and drain out of the second container 304 via the hole 308 into the third container 306.

Consequently, the melted powder may be allowed to solidify into a solid layer 312 that comprises a pure ingot of the powder in the second container 304. The melted second material may be allowed to solidify into a solid layer 314 in the third container 306. As a result, the solid layer 312 may be easily removed from the second container 304.

Similar, to the embodiment illustrated in FIG. 1, the second container 304 may have a controlled cooling mechanism. Slow controlled cooling in the second container 304 helps to achieve further purification of the solidified powder. Slow controlled cooling allows the impurities to partially segregate to the now ionic phase and allows a purified ingot from the original powder to form as it cools and solidifies. As a result, the contaminated phase may be localized and easily removed from the remaining pure solidified ingot from the original powder.

Similar to the first container 102 and the second container 104 of FIG. 1, the first container 302, the second container 304 and the third container 306 may also be lined with a lining material 320 such that it is inert with respect to the second material and the powder. For example, the first container 302, the second container 304 and the third container 306 may each be lined with graphite, silicon nitride or silicon carbide.

Similar to the process as described above with respect to FIG. 1, the powder may be processed through pre-cleaning steps to remove any organics and/or oxides on the powder. For example, the powder may be processed via pre-cleaning steps such as flotation separation, acetone or similar solvent cleaning to remove organics and partial etching with acid/oxidant mixtures such as those that can be obtained by mixtures of HF, $HNO_3$, HCl, $H_2O_2$ and the like to remove surface oxides and or metallic impurities.

Figure 4:
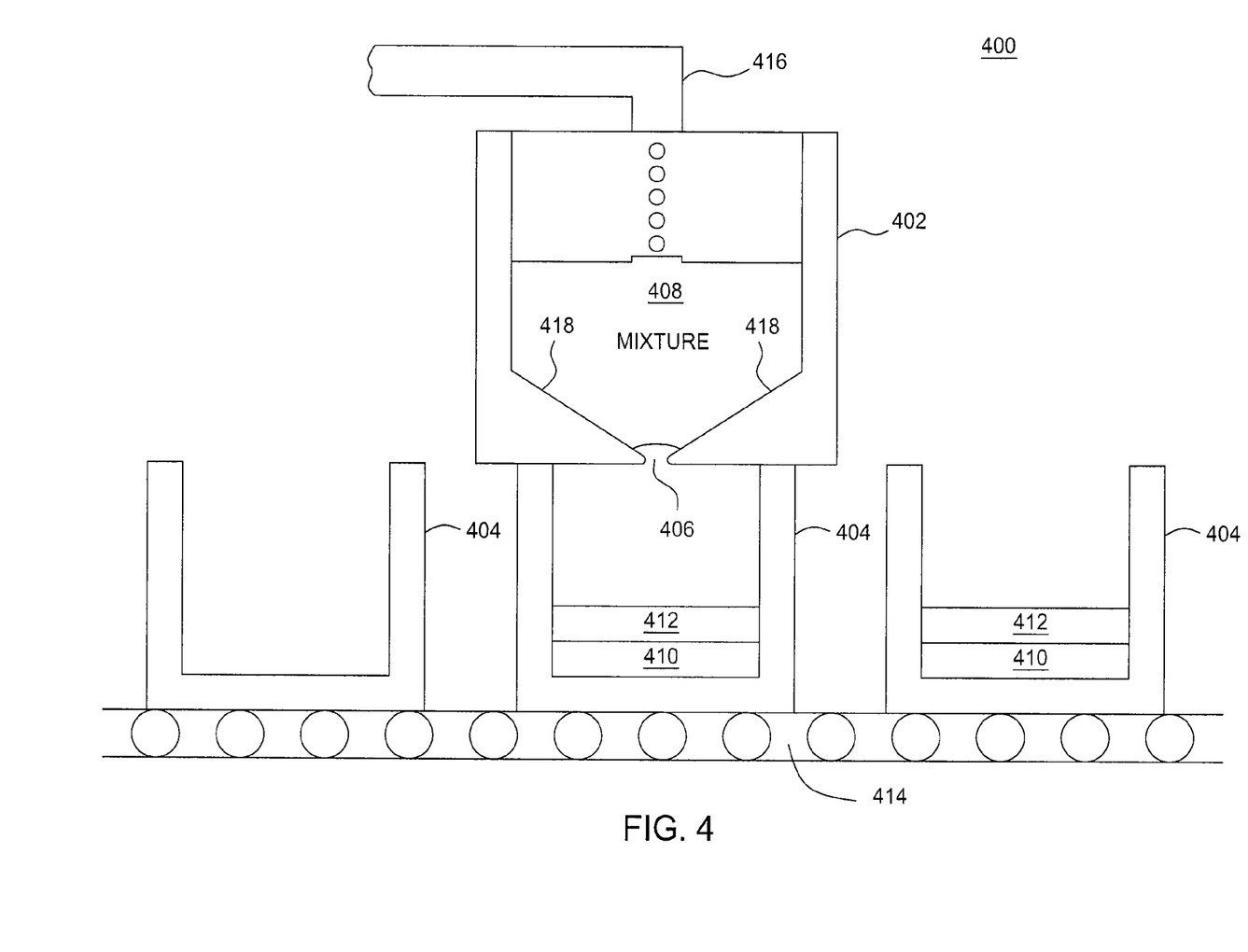
FIG. 4 depicts an embodiment of a continuous two stage system.

FIG. 4 illustrates one embodiment of a multi-stage system for performing the reaction and melt separation that includes a continuous flow processing system 400. The continuous flow processing system 400 includes a first container 402 and a plurality of second containers 404. The continuous flow processing system 400 includes a moving mechanism 414 for continuously feeding the plurality of second containers 404 to the first container 402. For example, the moving mechanism 414 may be a conveyer belt or a roller based mechanism.

The first container 402 may include a bottom geometry and an opening, e.g., a hole 406, that includes one or more inclined surfaces 418. In one embodiment, the first container 402 may be similar to that of the first container 102 in all respects as described above with respect to FIG. 1. The second containers 404 may also be similar to that of the second container 104 in all respects as described above with respect to FIG. 1.

In one embodiment, a continuous feed 416 of a mixture 408 of the powder and the second material may be provided to the first container 402. The mixture 408 may be processed as described above. For example, the mixture 408 may be heated to a first temperature to melt the second material and the second material may be drained out of the first container 402 and into the second container 404. The second material may be allowed to solidify in the second container 404 as a first layer 410.

Subsequently, the first container 402 may be heated to a second temperature to melt the powder and drain the melted powder out of the first container 402 into the second container 404. The melted powder may be allowed to solidify into a pure ingot of the original powder as a second layer 412 on top of the first layer 410. As discussed above, the second container 404 may have a controlled cooling mechanism to achieve further purification of the second layer 412 of the solidified melted powder.

Once the process is completed for one second container 404, the moving mechanism 414 may be activated to slide or move an empty second container 404 into position. Although FIG. 4 illustrates the second container 404 moving underneath the first container 402, the present embodiment is not so limited. For example, if the hole 406 is placed laterally on the first container 402, as discussed above, the moving mechanism 414 may move the second container 404 adjacent to the first container 402.

Although the continuous flow processing system 400 illustrates the use of a two-stage system, a three stage system may be also used. For example, multiple moving mechanisms 414 may be used to move multiple second containers and third containers.

In addition, although FIG. 4 illustrates the use of only one first container 402, it should be noted that multiple first containers 402 may be used. For example, multiple first containers 402 may be continuously fed a mixture of the powder and the second material. Each one of the multiple first containers 402 may have a second container 404 placed underneath a respective first container 402. Subsequently, the process may be completed as described above.

Figure 5:
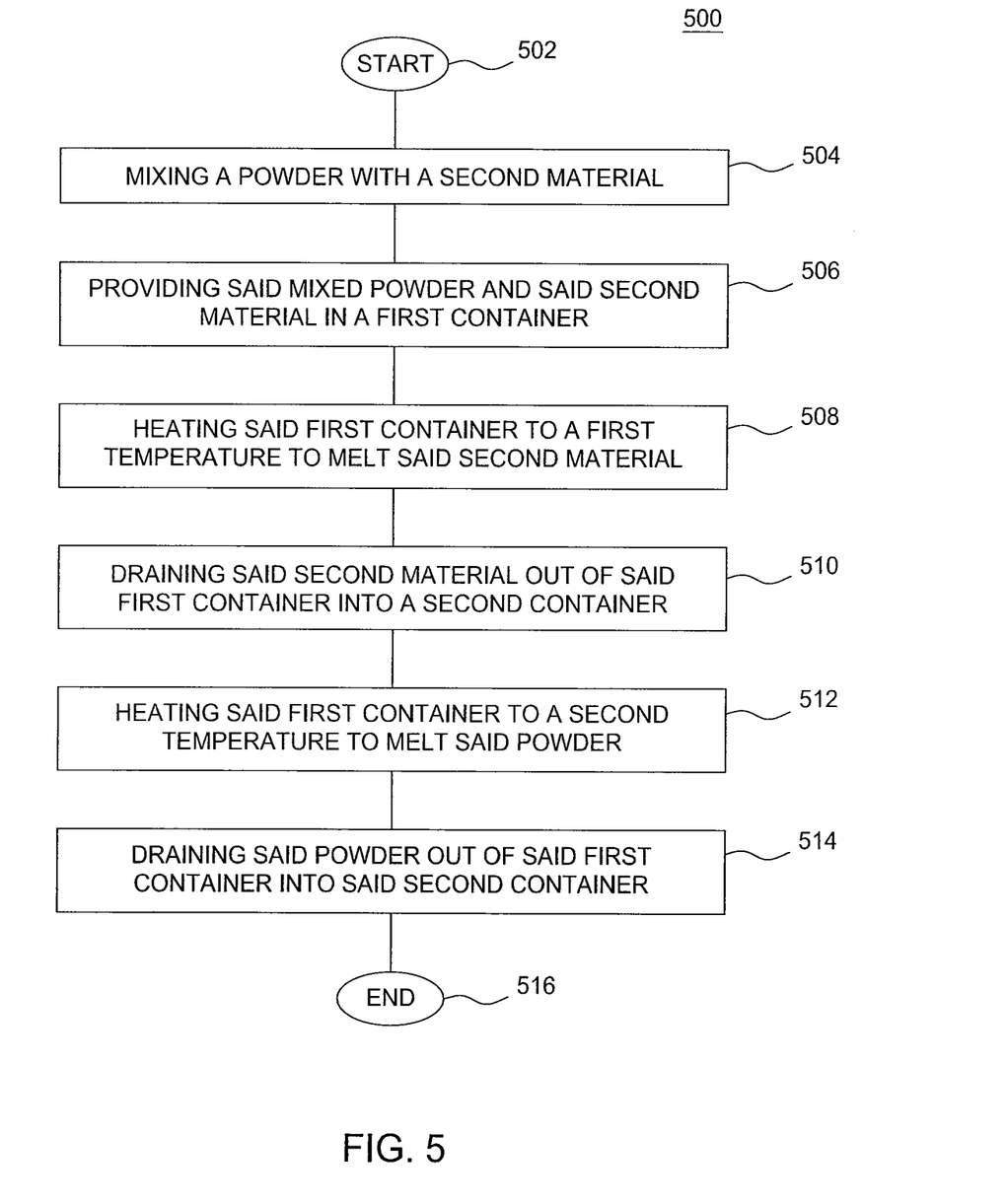
FIG. 5 depicts a flow diagram of one embodiment of a method of performing a two stage reaction and melt coalescence and separation.

FIG. 5 illustrates a flow diagram of one embodiment of a method 500 for performing melt coalescence and separation of a powder. In one embodiment, the method 500 may be carried out, for example, in any one of the multi-stage systems described above. For example, the method may be carried out in a two-stage system 100, a three-stage system 300 or a continuous flow processing system 400 as illustrated above. The powder may be fine powders generated from various industrial applications that involve various elements or compounds such as, for example, silicon, titanium, cadmium telluride (CdTe), gallium arsenide (GaAs) and the like.

The method 500 begins at step 502. At step 504, the method 500 mixes the powder with a second material. As discussed above, the second material may be a salt. For example, the salt may be an ionic halide. For example, the salt may be a halide and their mixtures of lithium (Li), sodium (Na), potassium (K), magnesium (Mg), strontium (Sr), calcium (Ca) or barium (Ba). For example, the ionic halide may be at least one of sodium fluoride (NaF), lithium fluoride (LiF), potassium fluoride (KF), calcium fluoride ($CaF_2$), strontium fluoride ($SrF_2$), barium fluoride ($BaF_2$) or lanthanum fluoride ($LaF_3$). In another embodiment, depending on what type of powder is used, the second material may contain a chloride, e.g., $CdCl_2$ for CdTe consolidation, or up to 20 percent volume of a silicate such as, for example, $Na_2SiO_3$ or may be an oxide such as, for example silica ($SiO_2$) for silicon melt consolidation or boric oxide ($B_2O_3$) for GaAs consolidation.

At step 506, the method 500 provides a mixture of the powder and the second material in a first container. For example, the first container may be first container 102, 302 or 402 as described above.

Although steps 504 and 506 are illustrated as separate steps, it should be noted that steps 504 and 506 may occur simultaneously. For example, the powder and the second material may be mixed as they are being placed in the first container. Alternatively, the powder and the second material may be mixed before being placed in the first container as illustrated by steps 504 and 506 above.

At step 508, the method 500 heats the first container to a first temperature to melt the second material. For example, the heating may be achieved by heating means 200 or any other equivalent heating means. As discussed above, the first temperature is dependent on the melting point of the second material used.

At step 510, the method 500 drains the second material out of the first container into a second container. Notably, the method 500 performs melt coalescence and separation simultaneously. The second container may be second container 104, 304 or 404 as described above. Alternatively, the "second container" may be the third container 306 described above with respect to the three-stage system 300 illustrated in FIG. 3. The second material may be allowed to cool and solidify in the second container to form a first solid layer.

At step 512, the method 500 heats the first container to a second temperature to melt said powder. For example, the heating may be achieved by heating means 200 or any other equivalent heating means. As discussed above, the second temperature is dependent on the type of powder that is used in the mixture.

At step 514, the method 500 drains the liquid resulting from melting the powder out of the first container into the second container. As a result, the drained liquid (e.g., a molten primary material) may be allowed to consolidate and solidify in the second container as a second solid layer on top of the first solidified layer of the second material and impurities. Thus, a pure ingot of the original powder may be formed as a solidified layer on top of the solidified second material. The method 500 concludes at step 516.

Thus, the present invention provides methods and systems for multi-stage reaction and melt coalescence and separation with accompanying purification. Pure ingots of various recycled powder materials may be achieved. The ingots may be used for various applications such as semiconductor fabrication or solar applications or alloy manufacturing or casting.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for performing melt coalescence and separation of a powder, said method comprising:
   mixing said powder with a second material;
   providing a mixture of said powder and said second material in a first container;
   heating said first container to a first temperature to melt said second material;
   draining said second material out of said first container into a second container;
   heating said first container to a second temperature to melt said powder; and
   draining said powder out of said first container into said second container.

2. The method of claim 1, further comprising:
   cooling said second container to create a pure solidified ingot of said powder on top of a solidified interface of said second material and impurities.

3. The method of claim 1, wherein draining said second material comprises partially draining said second material.

4. The method of claim 1, further comprising:
   pre-cleaning said powder before said mixing with said second material.

5. The method of claim 4, wherein pre-cleaning comprises:
   etching said powder in at least one of: HF, $HNO_3$ or $H_2O_2$; and
   separating said powder using at least one of: a flotation separation technique or a magnetic separation technique.

6. The method of claim 1, wherein said draining said second material and said powder comprises:
   draining via a hole in said first container.

7. The method of claim 1, wherein said draining said second material and said powder comprises:
   tilting said first container.

8. The method of claim 1, wherein said first container comprises at least one of: a graphite lined container, a silicon nitride lined container or a silicon carbide lined container.

9. The method of claim 1, wherein said second container comprises at least one of: a graphite lined container, a silicon nitride lined container or a silicon carbide lined container.

10. The method of claim 1, wherein said powder comprises at least one of: silicon (Si), titanium (Ti), gallium arsenide (GaAs) or cadmium telluride (CdTe).

11. The method of claim 1, wherein said powder comprises a fine powder, wherein at least 20 percent of said fine powder has a diameter of less than 1 micron.

12. The method of claim 1, wherein said powder comprises more than 20 percent nanometer sized fines.

13. The method of claim 12, wherein said powder comprises more than 50 percent nanometer sized fines.

14. The method of claim 13, wherein said powder comprises more than 66 percent nanometer sized fines.

15. The method of claim 1, wherein said salt comprises at least one of: an ionic halide, a silicate or an oxide.

16. The method of claim 15, wherein said ionic halide comprises at least one of: sodium fluoride (NaF), lithium fluoride (LiF), potassium fluoride (KF), calcium fluoride ($CaF_2$), strontium fluoride ($SrF_2$), barium fluoride ($BaF_2$) or lanthanum fluoride ($LaF_3$).

17. The method of claim 15, wherein said silicate comprises $Na_2SiO_3$.

18. The method of claim 1, wherein said at least one second container is located below said first container or adjacent to said first container.

19. The method of claim 1, further comprising:
   heating said second container to melt said second material, but allowing said powder to solidify; and
   draining said second material out of said second container into a third container.

* * * * *